United States Patent [19]
Chamberlain, IV

[11] Patent Number: 5,689,742
[45] Date of Patent: Nov. 18, 1997

[54] FULL FRAME ANNOTATION SYSTEM FOR CAMERA

[75] Inventor: Frederick Rockwell Chamberlain, IV, Vista, Calif.

[73] Assignee: Eastman Kodak Company, Rochester, N.Y.

[21] Appl. No.: 729,460

[22] Filed: Oct. 11, 1996

[51] Int. Cl.⁶ ............... G06B 17/24; H04N 5/222
[52] U.S. Cl. ............................. 396/313; 348/333
[58] Field of Search ..................... 396/291, 297, 396/298, 299, 300, 310, 313, 314, 315, 316, 317, 318, 319, 320, 321, 429; 348/333; 345/179, 180

[56] References Cited

U.S. PATENT DOCUMENTS

| | | | |
|---|---|---|---|
| 4,268,143 | 5/1981 | Dearing et al. | 354/106 |
| 4,361,388 | 11/1982 | Mlcak et al. | 354/106 |
| 4,453,814 | 6/1984 | Satoh et al. | 354/107 |
| 4,714,962 | 12/1987 | Levine | 358/289 |
| 4,973,996 | 11/1990 | Harvey | 354/106 |
| 5,003,329 | 3/1991 | Itabashi | 354/106 |
| 5,103,250 | 4/1992 | Arifuku et al. | 354/106 |

*Primary Examiner*—Safet Metjahic
*Assistant Examiner*—Nicholas J. Tuccillo
*Attorney, Agent, or Firm*—William F. Noval

[57] ABSTRACT

A camera having an annotation system comprising an optical imaging system for exposing photosensitive media to a scene, a digital imaging system for producing a digital image of the scene, a display for displaying the digital image, a touch sensitive user input layer overlaying the display for inputting annotation data, and a data recorder for recording the annotation data on the photosensitive media.

6 Claims, 4 Drawing Sheets

FULL FRAME ANNOTATION SYSTEM FOR CAMERA

FIELD OF INVENTION

This invention relates in general to photographic apparatus and relates more particularly to a camera having a full frame annotation system.

BACKGROUND OF THE INVENTION

Annotation of film in a camera was first implemented back in 1914 in the Kodak Autographic camera. This camera enabled handwritten information to be recorded directly onto the film. The photographer annotated a picture by opening a small door in the back of the camera housing, revealing a portion of the film covered by a carbon paper layer. A stylus was then used like a pen on the carbon paper, scratching lines through which light could reach the film. Holding the open door up to a light source for four or five seconds exposed the film according to the writing made with the stylus. Signatures, the date, or other graphical information could thereby be recorded onto the margin of film.

Present day annotation consists almost exclusively of camera systems which imprint a date onto the image area of the film, along the margin of the frame. These systems typically employ light emitting diodes (LEDs) or liquid crystal displays (LCDs) to provide the light which exposes the film. U.S. Pat. Nos. 4,268,143, 5,103,250, 4,361,388, and 4,973,996 all disclose camera systems which optically imprint the date and/or time onto the image margin or in between images. In all of these systems, the location and color and the data written is fixed, and is restricted to indicating when the picture was taken. These systems do not allow the photographer to add personal annotation.

U.S. Pat. No. 5,003,329 discloses a system which allows the date location to be moved to the bottom or side of the frame for either a horizontally or vertically orientation of the camera. U.S. Pat. No. 4,453,814 discloses a system which adjusts the color of the data written onto a photograph so that it will stand out from the background color of the image. These are both good improvements, but still do not allow personal annotation of each image, anywhere in the frame.

U.S. Pat. No. 4,714,962, Levine, discloses a dual camera system in which an electronic and photographic image are simultaneously taken. The electronic image may be previewed, and data pertaining to the image recorded onto the photographic film. Levine discusses optically imprinting the margin of the frame with photofinisher instructions, but does not discuss the recording of personal annotation such as signatures or freehand drawing anywhere within the frame of the photo.

Thus, a need exists for a camera to have the capability of user input of annotation anywhere on the image frame.

SUMMARY OF THE INVENTION

According to the present invention, there is provided a fulfillment of the needs and solution to the problems of the prior art.

According to a feature of the present invention, there is provide a camera having an annotation system comprising:

an optical imaging system for exposing photosensitive media to a scene;

a digital imaging system for producing a digital image of the scene;

a display for displaying the digital image;

a touch sensitive user input layer overlaying the display for inputting annotation data; and a data recorder for recording the annotation data on the photosensitive media.

ADVANTAGEOUS EFFECT OF THE INVENTION

The present invention has the following advantages.

1. A camera user can annotate an image anywhere on the film frame and not just along the edges. The annotations are not limited to printed characters, but can include signatures and freehand writing.

2. The annotation can be recorded as a latent image directly on the film, or if the film has a magnetic layer, the annotation can be recorded digitally on the magnetic layer leaving the original latent image pristine.

3. The annotation can be edited before being recorded on the film.

DETAILED DESCRIPTION OF THE EMBODIMENTS

In general, according to the present invention, there is provided a camera having an annotation system. The camera includes a camera having an annotation system comprising:

an optical imaging system for exposing photosensitive media to a scene;

a digital imaging system for producing a digital image of said scene;

a display for displaying said digital image;

a touch sensitive user input layer overlaying said display for inputting annotation data; and a data recorder for recording said annotation data on said photosensitive media.

The camera can contain film having a magnetic layer, as well as an electronic sensor, so that a high resolution image can be captured optically on film and a low resolution image captured by the electronic sensor can be displayed on a display.

Annotation is accomplished by using a touch screen layer on top of the image verifier LCD display. A stylus is used to enter information anywhere on the image. The image could be zoomed for adding detailed annotation, different colors could be selected, and editing features could be provided in high end models (essentially a mini PC paint program for manipulating the digital image). When the photographer has completed making and editing the annotation, it is transferred to the silver halide film by one of several different ways. A planar LED or LCD array located on the pressure plate or a linear LED or LCD array may be used to add the annotation as a latent image, either directly onto the photograph or onto a subsequent blank frame. The annotation may also be stored by digitizing and recording it onto the magnetic recording layer on the film.

Figure 1:
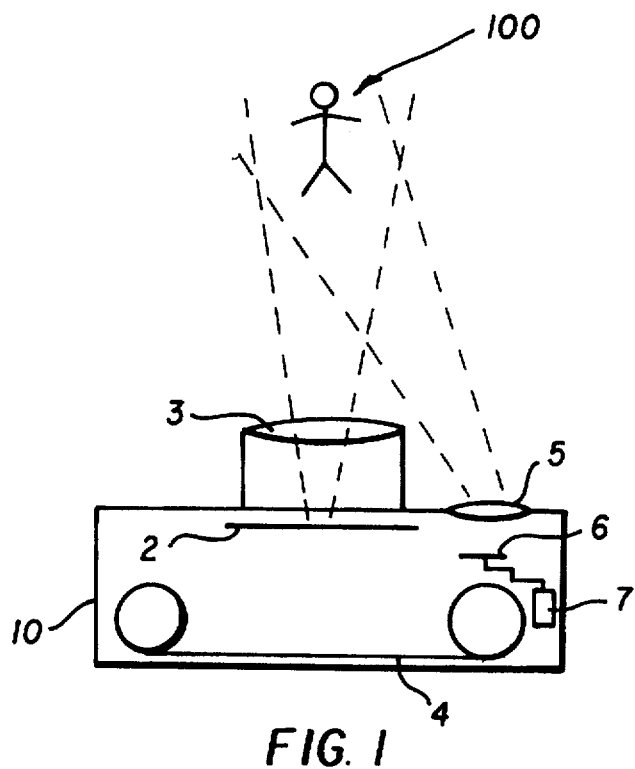
FIGS. 1 and 2 are top diagrammatic and perspective views of a camera incorporating the present invention.

FIG. 1 shows a top section view of camera 10 including the present invention. When a picture is taken, shutter 2 opens momentarily and light entering through lens 3 produces a silver halide latent image on photosensitive media, such as film strip 4 of scene 100. Simultaneously, light entering through lens 5 is sensed by CCD element 6 to produce a digital image of scene 100 which is stored in memory element 7.

Figure 2:
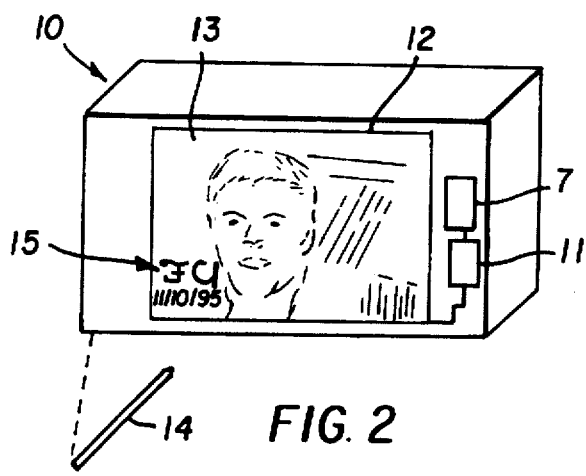

FIG. 2 shows the back surface of camera 10, where after a picture is taken, the digital image stored in memory element 7 is read by display driver 11 and then displayed on view screen 12, which may be an LCD or other type of display. View screen 12 is covered by a transparent touch sensitive layer 13 which overlays the entire surface of screen 12. A pointed stylus 14 is then used to input annotation 15 by writing on touch sensitive layer 13, and the path of stylus 14 on the touch sensitive layer 13 is recorded as digital input and immediately displayed on view screen 12.

Figure 3:
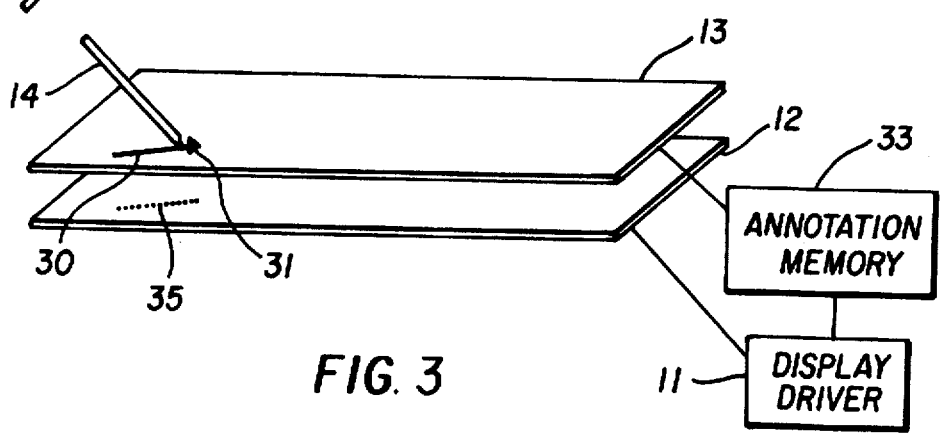
FIGS. 3, 4, and 5 are diagrammatic views useful in illustrating the present invention.

FIG. 3 shows a detail view of a single line of annotation being entered. As stylus 14 is pressed against touch screen 13 and moved along path 30 in the direction shown by arrow 31, the position of the stylus is electronically sensed and this data is sent to annotation memory 33. Memory 33 continuously updates display driver 11, which displays the input annotation onto view screen 12 as pixels 35.

Figure 4:
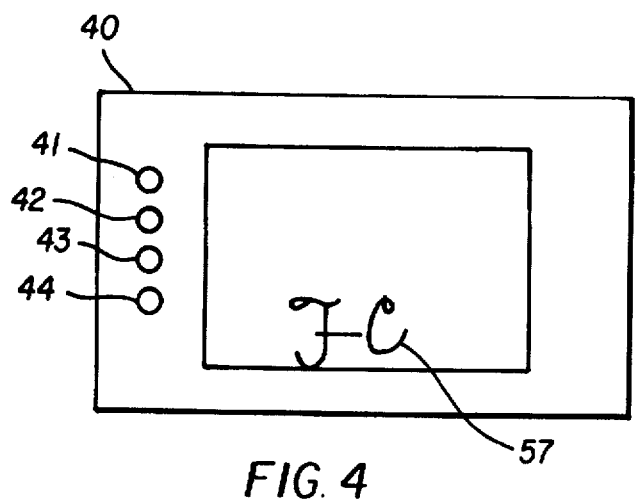
Figure 5:
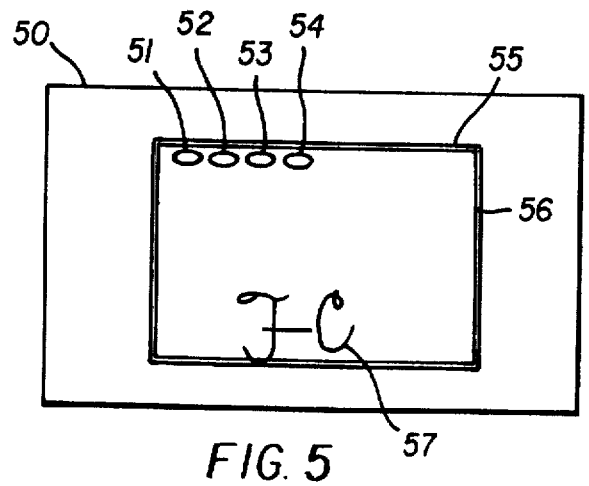

FIG. 4 shows a camera 40 which has a discreet set of electromechanical buttons 41, 42, 43, 44, which are pressed to control the style, color, line width, and other parameters of the input annotation 57.

When the photographer is finished with the annotation process, the annotation may be recorded to the film as a latent image in several different ways. Each of the different methods are described in detail below.

Figure 6:
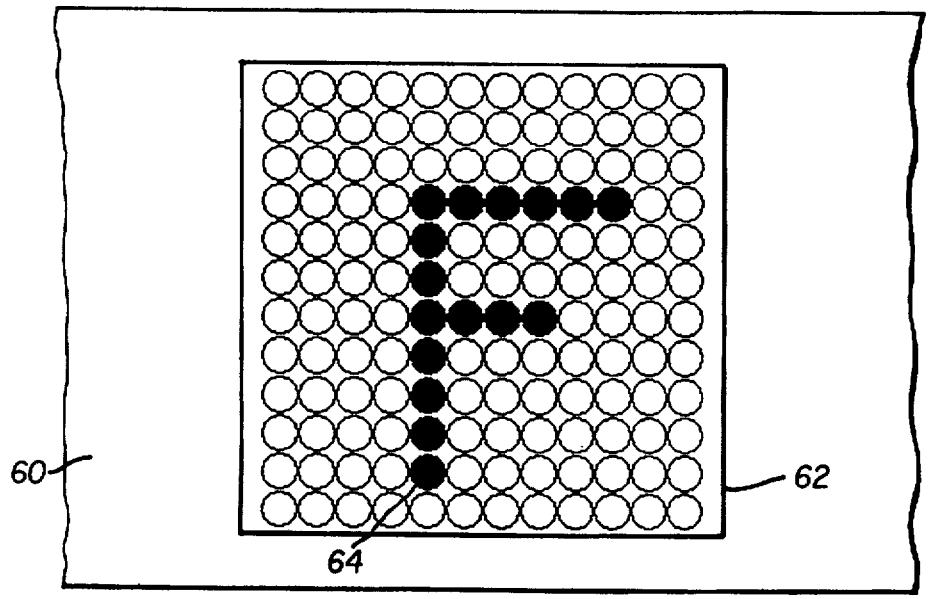
FIGS. 6, 7, 8, and 9 are diagrammatic views of exemplary data recorders for implementing the present invention.

The annotation can be recorded using a planar array of light generating elements, shown in FIG. 6. Film frame 60 is held in contact with flat light element array 62. In a camera, this array could simultaneously serve as the film backplane, which holds the film flat at the focal plane of camera optics. The display would have to have a pixel density comparable with minimum annotation input density. Annotation is stored to the film by illuminating specific elements, such as element 64 and other shaded elements as shown, in stored a latent image of the annotation onto the film. The annotation may be stored coincident with the photographic image or may be stored to a subsequent blank frame. The pixel elements may be monochromatic or may be an array of red, green, and blue elements to allow full color annotation. The primary drawback to this method is the cost associated with such a two-dimensional array.

Figure 7:
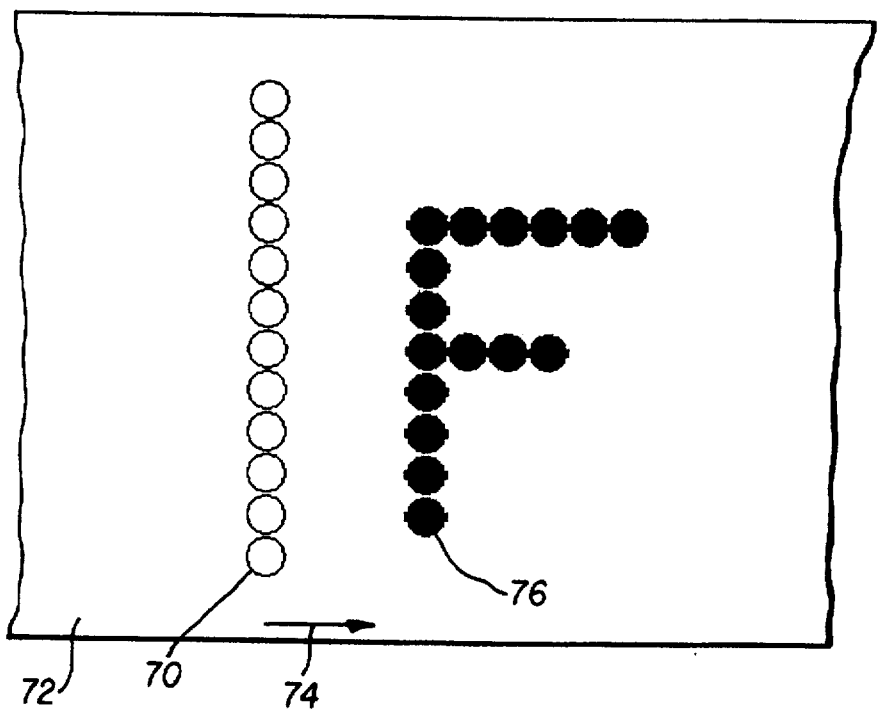

A lower cost linear array of light generating elements can be used to record the annotation onto the film. FIG. 7 shows light element array 70 located transverse to the film path. This linear array would expose the film 72 as it is advanced to the next frame, by pulsing the elements at the appropriate times as the film is moved across the array in the direction of arrow 74. The pixel elements are synchronized according to the input annotation as the, film moves past the array to produce latent image 76. Three successive linear arrays of red, green, and blue light generating elements could be used to write full color annotation. As in the previous method, the annotation may be stored coincident with the photographic image or may be stored to a subsequent blank frame.

A third method, which is made possible by recent advancements in film technology, is to magnetically record digital data which represents the annotation onto a transparent magnetic coating which coves the film. This method leaves the photograph pristine without using a separate blank frame to record the annotation. The data may be recorded in digital tracks or as a magnetic image.

Figure 8:
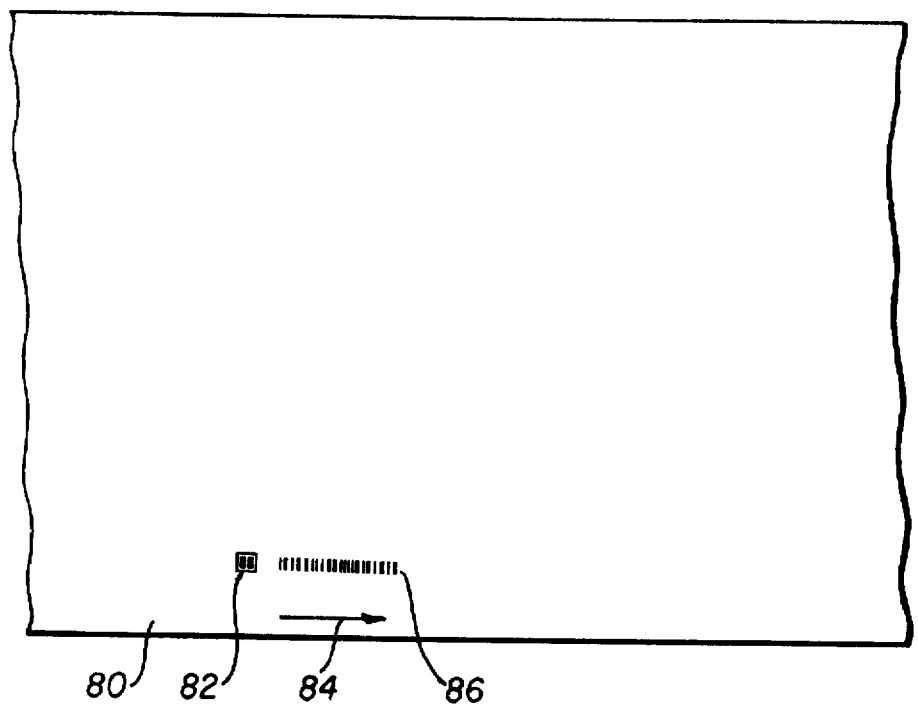

FIG. 8 shows film strip 80 moving past recording head 82 in the direction of arrow 84. Digital magnetic data 86, which contains the annotation information, is written to the film by head 82 as the film advances. Multiple tracks may be necessary depending on the recording density limits and amount of annotation. These tracks may be written by multiple heads or by having the film make several passes past the same head, incrementing the head track location each time.

Figure 9:
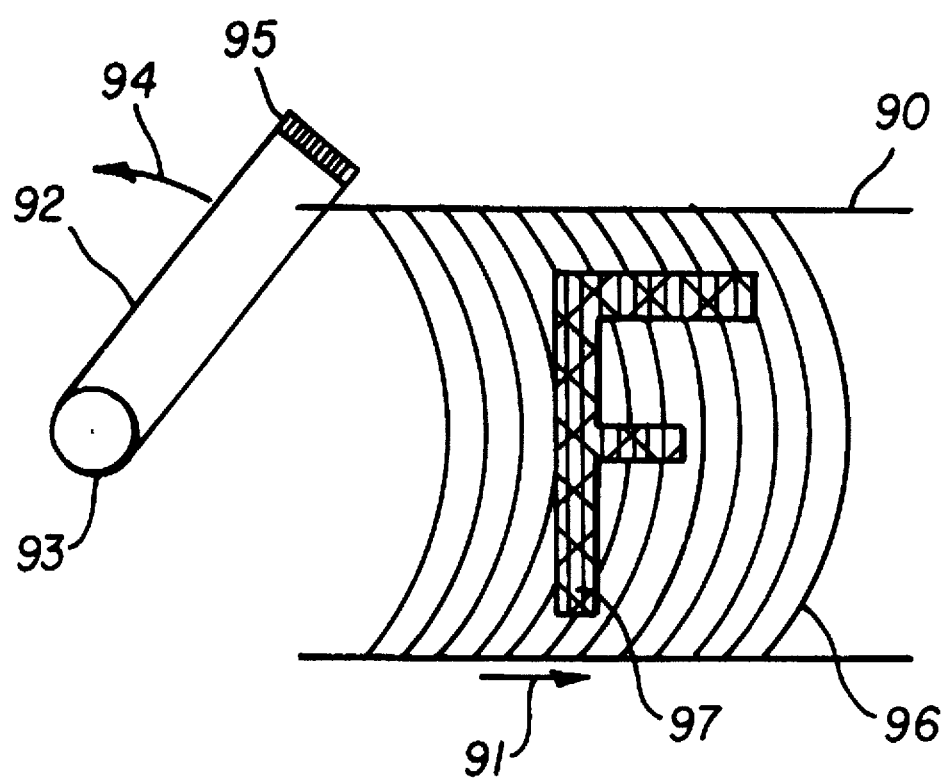

FIG. 9 shows an alternate way of recording the annotation magnetically, by writing a magnetic image. Film strip 90 is moved in direction 91 past recording head assembly 92, which rotates about hub 93 as indicated by arrow 94. On the end of assembly 92 is a magnetic recording head or heads 95, which sweep out successive arced paths similar to path 96. The magnetic head assembly 92 is used to record magnetic transitions, indicated by the shaded region 97, at the same locations as user input annotation. The resulting magnetic image may then be later scanned and recovered by a read head system during photofinishing. The arc scan method described is just one possible way to implement the recording of the magnetic image, and other methods, such as multiple track linear heads and helical scanning could also be employed.

The magnetic data is read by the photofinishing equipment. The consumer can select a range of printing options, for example, one print with annotation, one without. The annotation could also be printed onto a transparency overlay which could be flipped up to view the photo without annotation.

The invention has been described in detail with particular reference to a preferred embodiment thereof, but it will be understood that variations and modifications can be effected within the spirit and scope of the invention.

Parts List 2 shutter
3 lens
4 film strip
5 lens
6 CCD element
7 memory element
10 camera
11 display driver
12 view screen
13 touch sensitive layer
14 pointed stylus
15 input annotation
30 path
31 arrow
33 annotation memory
35 pixels
40 camera
41 electromechanical button
42 electromechanical button
43 electromechanical button
44 electromechanical button
57 input annotation
60 film frame
62 flat light element array
64 element
70 light element array
72 film
74 arrow
76 latent image
80 film strip
82 recording head
84 arrow 86 digital magnetic data
90 film strip
91 direction
92 recording head assembly
93 hub
94 arrow
95 magnetic recording head
96 path
97 shaded region

What is claimed is:

1. A camera having an annotation system comprising:

an optical imaging system for exposing photosensitive media to a scene;

a digital imaging system for producing a digital image of said scene;

a display for displaying said digital image;

a touch sensitive user input layer overlaying said display for inputting annotation data; and a data recorder for recording said annotation data on said photosensitive media.

2. The camera of claim 1 wherein said digital imaging system includes storage for storing said digital image.

3. The camera of claim 1 including a stylus for writing annotations on said touch sensitive user input layer.

4. The camera of claim 1 wherein said data recorder includes a two-dimensional array of light sources located in proximity to said photosensitive media for optically recording said annotation data on said photosensitive media.

5. The camera of claim 1 wherein said data recorder includes a linear array of light sources located in proximity to said photosensitive media for optically recording said annotation data on said photosensitive media while said linear array of light sources and said photosensitive media are moved relative to one another.

6. The camera of claim 1 wherein said photosensitive media includes a magnetic layer and wherein said data recorder records said annotation data magnetically on said magnetic layer.

\* \* \* \* \*